March 19, 1957 — E. V. SUNDT — 2,785,590
MULTIPLE SPEED REDUCER
Filed Feb. 17, 1956 — 3 Sheets-Sheet 1

INVENTOR.
Edward V. Sundt
By Wallenstein & Spangenberg, attys

March 19, 1957 E. V. SUNDT 2,785,590
MULTIPLE SPEED REDUCER
Filed Feb. 17, 1956 3 Sheets-Sheet 2

INVENTOR.
Edward V. Sundt
By Wallenstein + Spangenberg
atty

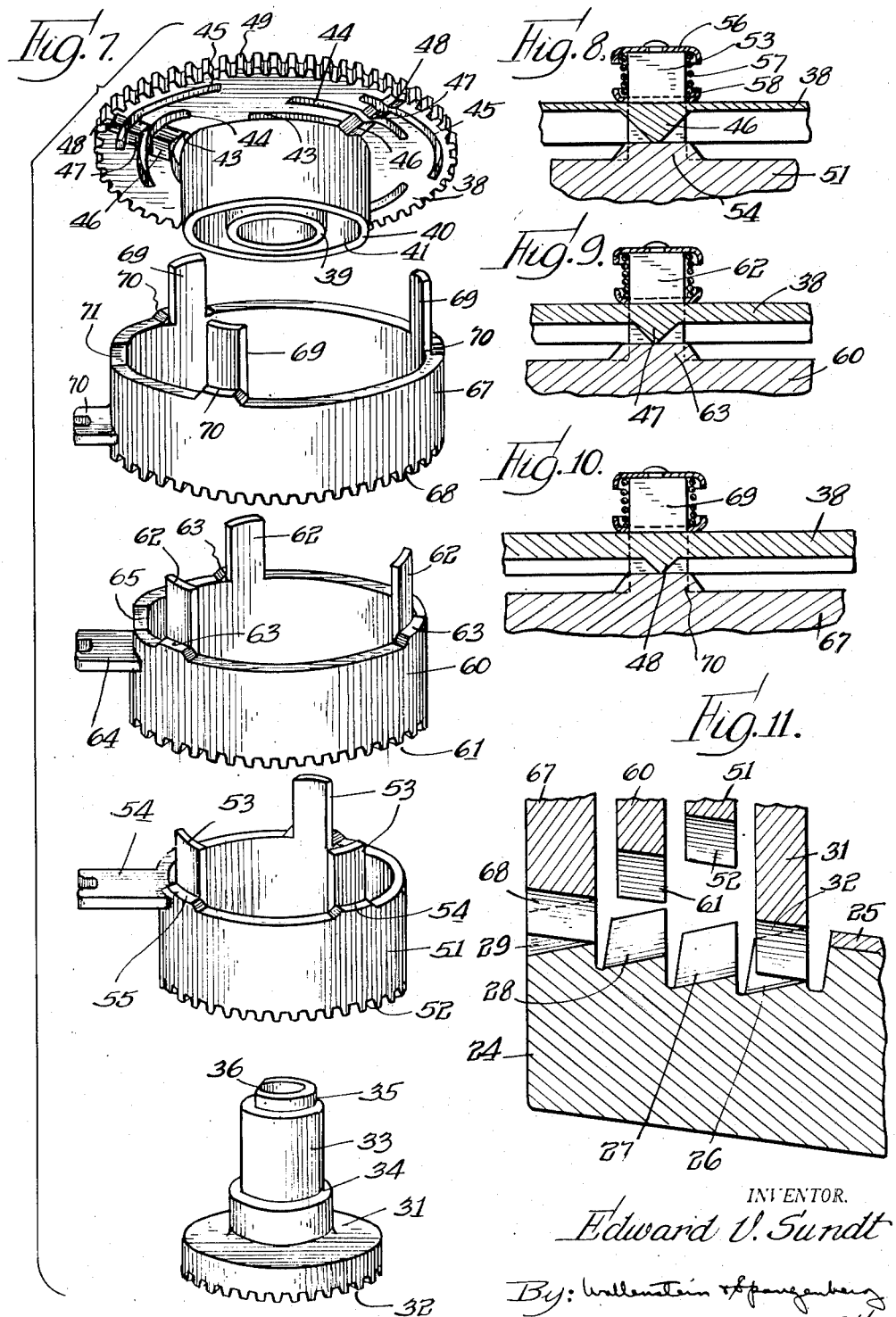

United States Patent Office 2,785,590
Patented Mar. 19, 1957

2,785,590
MULTIPLE SPEED REDUCER

Edward V. Sundt, Wilmette, Ill.

Application February 17, 1956, Serial No. 566,251

16 Claims. (Cl. 74—750)

This invention is directed to a multiple speed reducer and more particularly to a multiple speed driving mechanism for a phonograph turntable. This application is a continuation in part of my copending application Ser. No. 547,129, filed November 16, 1955.

The principal object of this invention is to provide an improved multiple speed reducer wherein desired different output speeds may be selectively obtained with a fixed input speed, wherein a simplified reducer mechanism is employed, wherein losses due to friction are kept to a minimum and transmission efficiency at a maximum, wherein speed selection is quickly and accurately obtained, and wherein noise is kept at a minimum.

Briefly, the multiple speed reducer of this invention includes a rotating shaft, an eccentric secured to the shaft for rotation therewith, and a member rotatably mounted on the eccentric and oscillated thereby. Preferably the eccentric is an oblique eccentric and the member is a wobbler member so that the member is oscillated by the eccentric in a wobbling manner. The member is provided with at least three rings of gear teeth concentrically arranged thereon and preferably these rings of gear teeth are arranged on one side of the member. At least three toothed gears are located adjacent the member. One of the toothed gears is rotatably mounted and has teeth continuously meshing with one of the rings of gear teeth on the member so as to be rotated by the member. The others of said toothed gears are secured against rotation and have teeth adapted to mesh respectively with the other rings of gear teeth on the member.

Means are provided for selectively shifting said other toothed gears into meshing engagement, respectively, with said other rings of gear teeth on said member to cause said other toothed gears to react, respectively, against said member to cause said one toothed gear to be selectively rotated at different desired speeds. By appropriately selecting the numbers of teeth in the rings of gear teeth on the member and the teeth on the toothed gears desired output speeds and speed ratios may be obtained.

To obtain two different output speeds, three toothed gears and three rings of gear teeth on the member are utilized. To obtain three different output speeds, four toothed gears and four rings of gear teeth on the member are used, and for additional different output speeds, additional toothed gears and rings of gear teeth may be used. While the multiple speed reducer of this invention has many possible uses, it is particularly useful for operating phonograph turntables at selected speeds, for example, of 33, 45 and 78 R. P. M. Since said other toothed gears are secured against rotation and are selectively shifted into meshing engagement with the member for desired speeds of operation, friction and noise are reduced to a minimum and higher efficiency and more noise free operation is obtained than when all toothed gears continuously mesh with the member as in my aforementioned application.

Further objects of this invention reside in the details of construction of the multiple speed reducer, and in the cooperative relations between the component parts thereof.

Other objects and advantages will become apparent to those skilled in the art upon reference to the accompanying specification, claims and drawings in which:

Fig. 7 is an exploded perspective view of the various toothed gears utilized in the multiple speed reducer.

Figs. 8, 9 and 10 are sectional views illustrating the cam action for shifting the various toothed gears.

Fig. 11 is an enlarged sectional view showing the cooperation between the teeth on the toothed gears and the rings of teeth on the wobbler member.

Figure 1:
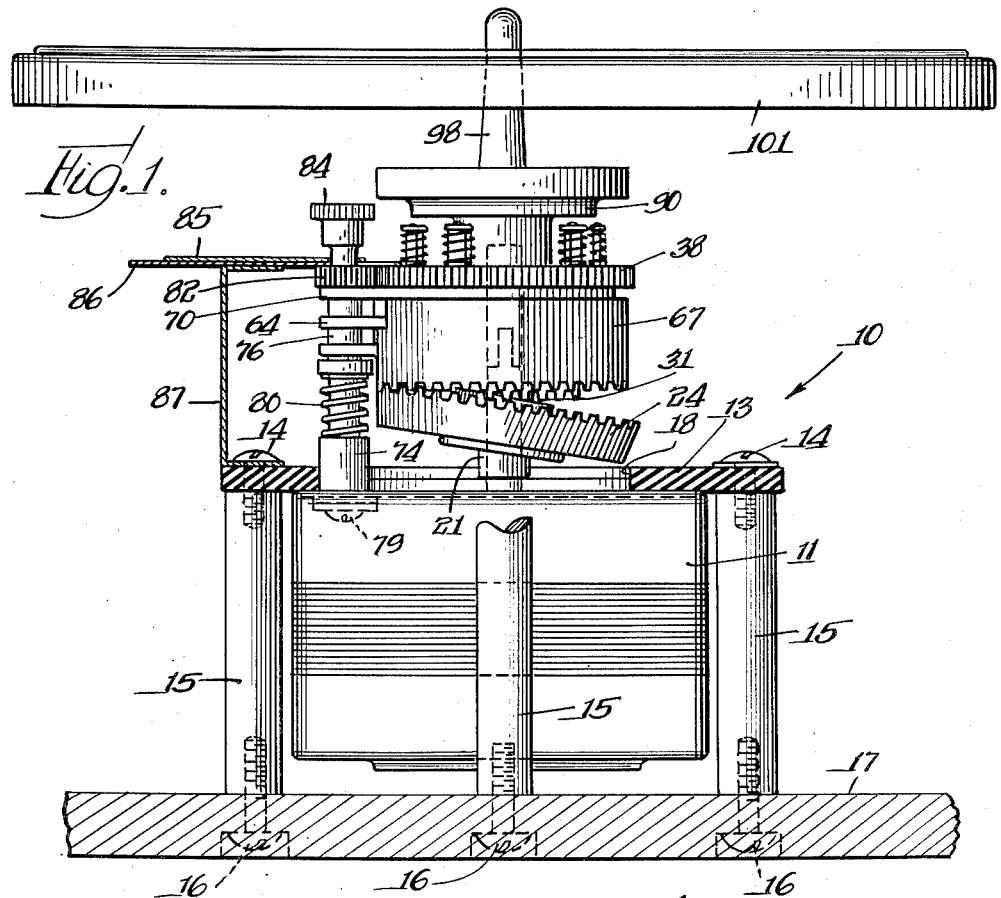
Fig. 1 is a side elevational view of the multiple speed reducer of this invention.

The multiple speed reducer of this invention is generally designated at 10, and it includes an electric motor 11 which is secured by screws 12 to a resilient disk 13 which may be formed from rubber or the like. The resilient disk 13 is secured by screws 14 to supporting posts 15 which are in turn secured by screws 16 to a mounting base 17. In this way, the electric motor 11 is resiliently supported by the mounting base 17. The resilient disk 13 is provided with a central opening 18 through which the shaft 19 of the electric motor extends. For purposes of illustration herein, it is assumed that the shaft 19 is rotated at a speed of 1800 R. P. M. in a counter-clockwise direction as viewed in Fig. 4, and as viewed from the top of Figs. 1 and 3.

An eccentric 21 in the form of an oblique eccentric is secured to the shaft 19 by swedging or staking, as indicated at 22 so that the eccentric is supported and rotated by the shaft. The eccentric 21 is provided with a flange 23 and a member 24 in the form of a wobbler member is rotatably mounted on the eccentric 21, and abuts against the flange 23. The wobbler member 24 is maintained on the oblique eccentric 21 by a ring 25 pressed fit onto the eccentric 21. Thus, the member 24 is rotatably mounted on and supported by the eccentric 21 and, as the eccentric 21 is rotated, the member 24 is oscillated in a wobbling manner. The member 24 is provided with four rings of gear teeth 26, 27, 28 and 29, respectively, and these rings of gear teeth are preferably formed in one side face of the wobbler member 24. The wobbler member 24 may be formed of any suitable material as, for example, nylon or the like; and the eccentric 21 is preferably molded of porous iron which is impregnated with a suitable lubricant for lubricating the running surfaces between it and the member 24.

Rotatably mounted on and supported by the shaft 19 is a first toothed gear 31, having teeth 32 which mesh with the teeth 26 on the member 24. This toothed gear 31 is provided with a sleeve hub 33 for journaling the same for rotation on the shaft 19, and this sleeve hub 33 is provided with a shoulder 34 intermediate its ends and another shoulder 35 adjacent its outer end. The sleeve hub 33 is provided with a flat 36 adjacent the shoulder 35. Thus as the wobbler member 24 is rotated, the rotation thereof is imparted to the toothed gear 31 by means of the intermeshing teeth 26 and 32.

A cam plate 38 having a hub 39 is carried by the sleeve hub 33 of the first toothed gear 31 and is rotatably mounted with respect thereto. This cam plate 38 is provided with a flange 40 to provide a cavity 41 between it and the hub 39 for the purpose of receiving a wick 42 which is impregnated with a suitable lubricant 42. The cam plate 38 is preferably a metal die casting and the first toothed gear 31 is preferably made of molded porous iron which is impregnated with a suitable lubricant. The wick 42 operates to supply lubricant to the toothed gear 31 for lubricating the running surfaces between it and the shaft 19 and cam plate 38. The cam plate 38 is provided with three sets of circumferentially arranged slots 43, 44 and 45, there being three slots in each set. The slots 43, 44 and 45 are radially spaced with respect to each other. Located adjacent the slots 43 on the underside of the cam plate 38 are cams 46, and likewise cams 47 and 48 are located adjacent the slots 44 and 45, respectively. It is here noted that the cams 46, 47 and 48 are in substantial radial alignment, while the slots 43, 44 and 45 are circumferentially offset with respect to each other. The periphery of the cam plate 33 is provided with gear teeth 49 which are utilized for rotatably positioning the cam plate about the axis of the motor shaft 19.

A second toothed gear 51 is mounted on the flange 40 of the cam plate 38 and is mounted for rotation and sliding with respect thereto. This toothed gear 51 is provided with teeth 52 which are adapted to mesh with the teeth 27 on the wobbler member 24. This toothed gear 51 is also provided with a plurality of projections 53 which are slidably received in the slots 43 in the cam plate 38, and adjacent each projection 53 there is provided a cam follower surface 54. The toothed gear 51 is also provided with an ear 55 having an outer bifurcated end. The purpose of the ear 55 is to secure the toothed gear 51 against rotation. The outer end of each projection 53 has a clip 56 secured thereto and a spring 57 extends between this clip 56 and a clip 58 slidably mounted on the cam plate 38. The spring 57 operates to retract the toothed gear 51 away from the wobbler member 24. However, when the cam plate 38 is rotated to cause the cams 46 thereon to engage the cam follower surfaces 54 on the toothed gear 51, the toothed gear 51 is advanced against the action of the springs 57 to cause the teeth 52 thereof to mesh with the ring of gear teeth 27 on the wobbler member 24. In this way the toothed gear 51, which is secured against rotation, may be selectively shifted into meshing engagement with the wobbler member 24 to react against the same and control the rotation thereof.

A third toothed gear 60 is slidably mounted on the second toothed gear 51 and it is provided with teeth 61 which are adapted to mesh with the ring of gear teeth 28 on the wobbler member 24. Here also the toothed gear 60 is provided with a plurality of projections 62, these projections 62 extending through the slots 44 in the cam plate 38. The toothed gear 60 is maintained in retracted position by means of springs in the same way as in the case of the toothed gear 51. Located adjacent each projection 62 is a cam follower surface 63 which cooperates with the cams 47 on the cam plate 31. Thus, when the cam plate 38 is rotated to a position so that the cams 47 thereon engage the cam follower surfaces 63 on the toothed gear 60, the latter is advanced against the action of the springs to cause the same to mesh with the wobbler member 24. Here also the toothed gear 60 is provided with a bifurcated ear 64 for securing the toothed gear 60 against rotation. The toothed gear 60 is also provided with a slot 65 for accommodating the ear 55 of the toothed gear 51.

A fourth toothed gear 67 is slidably mounted on the third toothed gear 60 and is provided with teeth 68 which are adapted to mesh with the ring of gear teeth 29 on the wobbler member 24. This toothed gear 67 is provided with projections 69 which extend through the slots 45 in the cam plate 38 and the toothed gear 67 is normally maintained in retracted position by means of springs associated with the projections 69 as in the case of the toothed gear 51. Cam follower surfaces 70 are arranged on the toothed gear 67 adjacent the ears 69 for cooperation with the cams 48 on the cam plate 38, and the toothed gear 67 is secured against rotation by a bifurcated ear 70. Here also, the toothed gear 67 is provided with a slot 71 for accommodating the bifurcated ears 55 and 64 of the toothed gears 51 and 60. When the cam plate 38 is rotated to a position wherein the cams 48 engage the cam follower surfaces 70, the toothed gear 67 is advanced against the action of the springs to cause the same to mesh with the wobbler member 24.

A screw threaded sleeve 73, having a flange 75 engaging the inner surface of the casing of the motor 11, has a collar 74 screw-threaded thereon for rigidly securing the sleeve 73 in place on the motor 11. This sleeve 73 provides a journal for an adjusting post 76 which is rotatably mounted therein. Secured to the bottom of the adjusting post 76 by a screw 79 is a washer 78. A flange 77 on the adjusting post 76 is arranged above the sleeve 73 and a spring 80 is interposed between the flange 77 and the collar 74. This spring 80 operates to cause a frictional engagement between the washer 78 and the flange 75 of the sleeve 73 so that the adjusting post 76 may be rotated to desired positions and then held frictionally in the desired adjusted positions. The bifurcated ends of the ears 55, 64 and 70 of the toothed gears are received over the adjusting post 76 and, in this way, they operate to secure the toothed gears 51, 60 and 67 against rotation.

Figure 2:
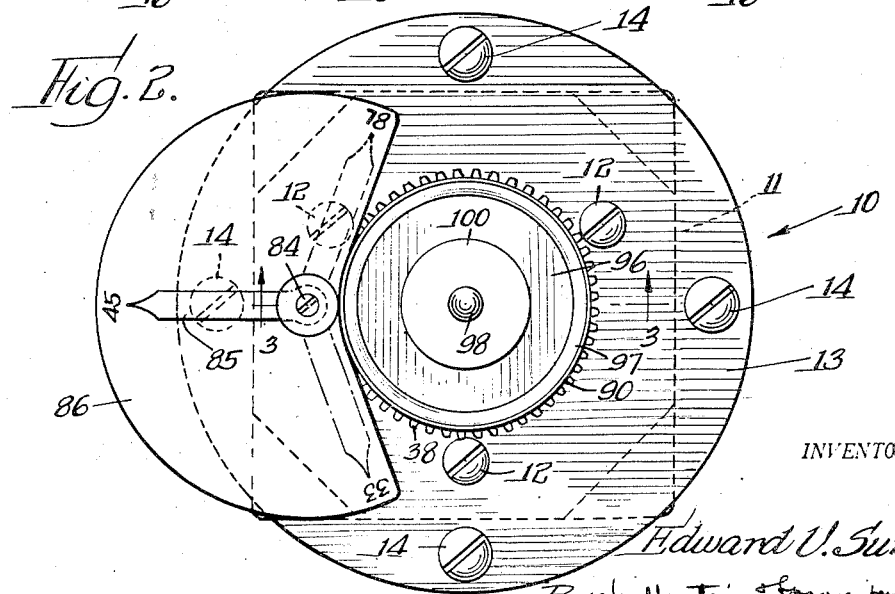
Fig. 2 is a top plan view of the multiple speed reducer with the phonograph turntable omitted.

A pinion 82 meshing with the teeth 49 on the cam plate 38 is carried by the adjusting post 76 so that as the adjusting post 76 is rotated, the cam plate 38 is rotated. The upper end of the adjusting post 76 is screw-threaded as indicated at 83 for carrying a knurled knob 84 to facilitate rotative adjustments of the post 86. A pointer 85 may be secured to the adjusting post 76 and may cooperate with a suitable dial 86 for indicating the rotative adjustment of the cam plate 38, as illustrated in Figs. 1 and 2. The dial plate 86 may be secured in place by means of a bracket 87. The dial plate may be provided with suitable indications for indicating output speeds as, for example, 33, 45 and 78 R. P. M. in the case of a multiple speed drive mechanism for a phonograph turntable.

For purposes of illustration, it is assumed that the numbers of teeth on the toothed gear 31 and in the ring of gear teeth 26 on the member 24 are the same, as for example, 24 teeth in each. This being the case the toothed gear 31 is rotated at the same speed as the wobbler member 24 is rotated. It is also assumed that the ring of gear teeth 27 on the member 24 has 23 teeth and that the teeth 52 on the toothed gear 51 are 24 in number. Thus when the cam plate 38 is rotated to a position to cause the toothed gear 51 to mesh with the wobbler member 24 to react against the same, the wobbler member 24 will be rotated at a speed of $$\frac{1800}{23} = 78.3 \text{ R.P.M.}$$

in a counter-clockwise direction, that is, in the same direction as the shaft 19 and eccentric 21 are rotated at 1800 R. P. M. Since the toothed gear 31 is rotated at the same speed as the member 24, then it, likewise, under these conditions, is rotated at 78.3 R. P. M.

It is also assumed that the ring of gear teeth 28 on the wobbler member 24 has 40 teeth and that the toothed gear 60 has 41 teeth. When the toothed gear 60 is advanced by appropriate adjustment of the cam plate 38, it is moved into meshing engagement with the wobbler member 24 to react against the wobbler member and to cause the wobbler member to rotate in a counter-clockwise direction at a speed of $$\frac{1800}{40} = 45 \text{ R.P.M}$$

Thus, under these conditions, the toothed gear 31 is rotated in a counter-clockwise direction at 45 R. P. M. It was also assumed that the ring of gear teeth 29 on the member 24 has 54 teeth and that there are 55 teeth on the toothed gear 67. Thus, when the cam plate 38 is rotated to a position to advance the toothed gear 67 into meshing engagement with the wobbler member 24, the wobbler member is rotated in a counter-clockwise direction at a speed of $$\frac{1800}{54} = 33.3 \text{ R.P.M.}$$

Thus, under these conditions, the toothed gear is rotated at 33.3 R. P. M.

Figure 3:
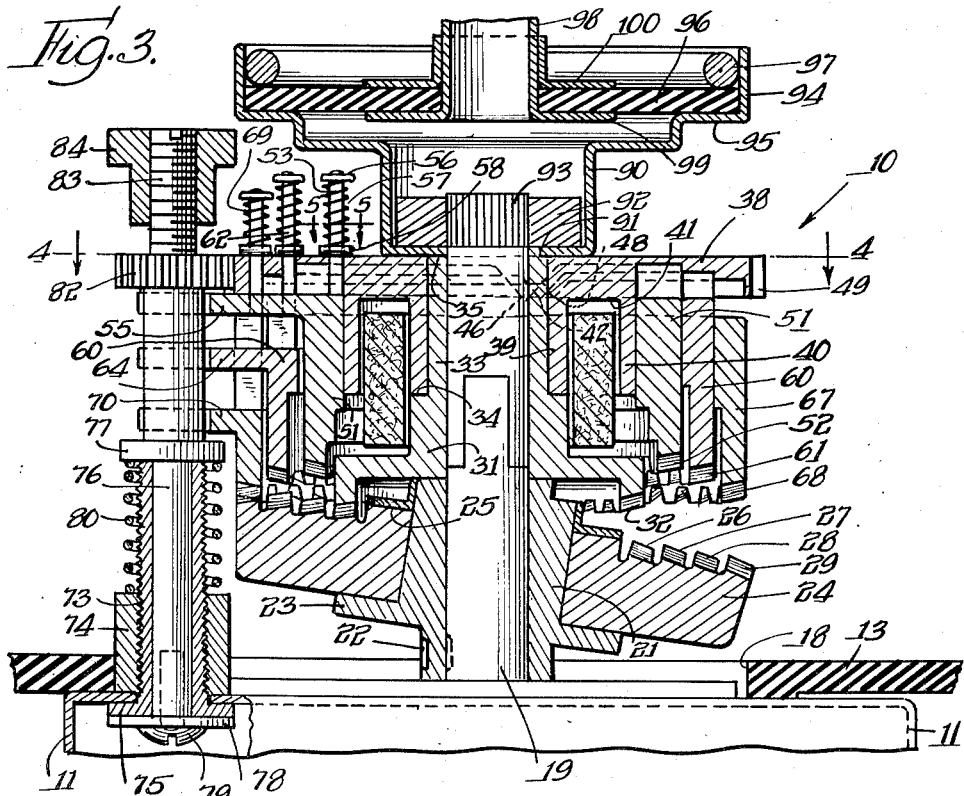
Fig. 3 is an enlarged sectional view taken substantially along the line 3—3 of Fig. 2.
Figures 4, 5, 6:
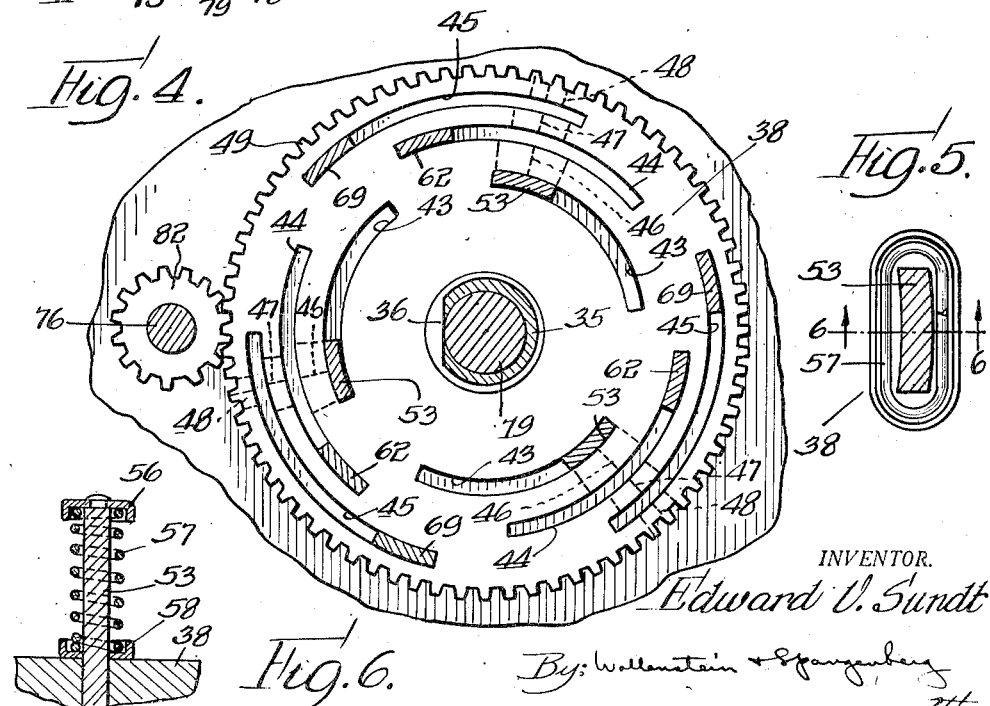
Fig. 4 is a horizontal sectional view taken substantially along the line 4—4 of Fig. 3.
Fig. 5 is a partial sectional view taken substantially along the line 5—5 of Fig. 3.
Fig. 6 is a partial sectional view taken substantially along the line 6—6 of Fig. 5.

In Fig. 2, the parts are shown in a position to provide an output speed of 45 R. P. M., and under these conditions the cam plate 38 is in an intermediate position with the toothed gear 60 in meshing engagement with the wobbler member 54 and with the other toothed gears 51 and 67 retracted. In Fig. 3, the parts are shown in position for providing an ouput speed of 33.3 R. P. M. and here the cam plate 38 is rotated to a position where the toothed gear 67 is advanced to mesh with the wobbler member 24, and the other toothed gears 51 and 60 are retracted. In Fig. 4, the parts are shown in position to provide output speeds of 78.3 R. P. M. and here the toothed gear 51 is advanced to meshing engagement with the wobbler member 24 and the other toothed gears 60 and 67 are retracted. Accordingly, by manipulating the knob 84 on the adjusting post 76, the cam plate 38 is rotatably positioned to three adjusted positions for providing three speeds of operation of the toothed gear 31, as for example 33.3, 45 and 78.3 R. P. M., the pointer 85 cooperating with the dial 86 indicating the selected output speed.

For driving a phonograph turntable, a bell-shaped member 90 having an internal flange 91 is carried against the shoulder 35 on the flattened end 36 of the sleeve 33 of the toothed gear 31, and it is held in place thereon by a collar 92 pressed fit on the end 93 of the shaft 19. The bell-shaped member 90 has a flange 94 forming a shoulder 95 against which is received a resilient disk 96, the disk being held in place by a suitable split ring 97. A spindle 98 having a flange 99 extends through a central opening in the resilient disk 96 and is clamped in place by a ring 100 pressed fit onto the spindle 98. In this way the spindle 98 is resiliently mounted on the bell-shaped member 90 by the resilient disk 96 which is preferably made of rubber or the like. The spindle 98 carries a turntable 101 in the usual manner.

To obtain quiet operation with the least amount of gear friction, it is desirable to so construct the gear teeth that, as they are coming into engagement with each other, there is substantially a point contact as distinguished from a line contact. Toward this end the top edges of the gears are arranged at an angle with respect to the radial axis of the gear members and the wobbler member. For the optimum results in the particular embodiment here described, and, as shown in more detail in Fig. 11, this angle is made equal to the angle of the oblique eccentric, namely 7½°. The various elements of the multiple speed reducer are concentrically arranged about the motor shaft and are supported thereby so that a simple and compact assembly is realized and the need for extraneous bearing, etc., is eliminated. Since the reaction gears 51, 60 and 67 are secured against rotation and are selectively shifted into engagement with the wobbler member, noise and friction are maintained at a minimum and it is not necessary to provide running clearances and lubricated surfaces therebetween, as where the various toothed gears are continuously rotating and in mesh with the wobbler member.

While for purposes of illustration, one form of this invention has been disclosed, other forms thereof may become apparent to those skilled in the art upon reference to this disclosure and, therefore, this invention is to be limited only by the scope of the appended claims.

I claim as my invention:

1. A multiple speed reducer comprising, a rotating shaft, an eccentric secured to the shaft for rotation therewith, a member rotatably mounted on the eccentric and oscillated thereby and having at least three rings of gear teeth arranged thereon, at least three toothed gears adjacent the member, one of said toothed gears being rotatably mounted and having teeth continuously meshing with one of the rings of gear teeth on the member so as to be rotated by the member, the others of said toothed gears being secured against rotation and having teeth adapted to mesh respectively with the other rings of gear teeth on the member, and means for selectively shifting said other toothed gears into meshing engagement respectively with said other rings of gear teeth on said member to cause said other toothed gears to react respectively against said member to cause said one toothed gear to be selectively rotated at different speeds.

2. A multiple speed reducer comprising, a rotating shaft, an oblique eccentric secured to the shaft for rotation therewith, a wobbler member rotatably mounted on the oblique eccentric and wobbled thereby and having at least three rings of gear teeth concentrically arranged thereon, at least three toothed gears located adjacent the wobbler member, one of said toothed gears being rotatably mounted and having teeth continuously meshing with one of the rings of gear teeth on the member so as to be rotated by the member, the others of said toothed gears being secured against rotation and having teeth adapted to mesh respectively with the other rings of gear teeth on the member, and means for selectively shifting said other toothed gears into meshing engagement respectively with said other rings of gear teeth on said member to cause said other toothed gears to react respectively against said member to cause said one toothed gear to be selectively rotated at different speeds.

3. A multiple speed reducer comprising, a rotating shaft, an oblique eccentric secured to the shaft for rotation therewith, a wobbler member rotatably mounted on the oblique eccentric and wobbled thereby and having at least three rings of gear teeth concentrically arranged on one side face thereof, at least three toothed gears concentrically located about the shaft adjacent said side face of the wobbler member, one of said toothed gears being rotatably mounted and having teeth continuously meshing with one of the rings of gear teeth on the member so as to be rotated by the member, the others of said toothed gears being secured against rotation and having teeth adapted to mesh respectively with the other rings of gear teeth on the member, and means for selectively shifting said other toothed gears into meshing engagement respectively with said other rings of gear teeth on said member to cause said other toothed gears to react respectively against said member to cause said one toothed gear to be selectively rotated at different speeds.

4. A multiple speed reducer comprising, a rotating shaft, an oblique eccentric secured to the shaft for rotating therewith, a wobbler member rotatably mounted on the oblique eccentric and wobbled thereby and having at least three rings of gear teeth concentrically arranged on one side face thereof, at least three toothed gears concentrically located about the shaft adjacent said side face of the wobbler member, one of said toothed gears having a sleeve hub rotatably mounted on said shaft and having teeth continuously meshing with one of the rings of gear teeth on the member so as to be rotated by the member, the others of said toothed gears being secured against rotation and having teeth adaptd to mesh respectively with the other rings of gear teeth on the member, and means for selectively shifting said other toothed gears into meshing engagement respectively with said other rings of gear teeth on said member to cause said other toothed gears to react respectively against said member to cause said one toothed gear to be selectively rotated at different speeds.

5. A multiple speed reducer comprising, a rotating shaft, an eccentric secured to the shaft for rotation therewith, a member rotatably mounted on the eccentric and oscillated thereby and having at least three rings of gear teeth arranged thereon, at least three toothed gears adjacent the member, one of said toothed gears being rotatably mounted and having teeth continuously meshing with one of the rings of gear teeth on the member so as to be rotated by the member, the others of said toothed gears being secured against rotation and having teeth adapted to mesh respectively with the other rings of gear teeth on the member, cam followers on said other toothed gears, and a rotatable cam plate having cams thereon selectively engageable with the cam followers on said toothed gears as said cam plate is rotatably positioned for selectively shifting said other toothed gears into meshing engagement respectively with said other rings of gear teeth on said member to cause said other toothed gears to react respectively against said member to cause said one toothed gear to be selectively rotated at different speeds.

6. A multiple speed reducer comprising, a rotating shaft, an oblique eccentric secured to the shaft for rotation therewith, a wobbler member rotatably mounted on the oblique eccentric and wobbled thereby and having at least three rings of gear teeth concentrically arranged thereon, at least three toothed gears located adjacent the wobbler member, one of said toothed gears being rotatably mounted and having teeth continuously meshing with one of the rings of gear teeth on the member so as to be rotated by the member, the others of said toothed gears being secured against rotation and having teeth adapted to mesh respectively with the other rings of gear teeth on the member, cam followers on said other toothed gears, and a rotatable cam plate having cams thereon selectively engageable with the cam followers on said toothed gears as said cam plate is rotatably positioned for selectively shifting said other toothed gears into meshing engagement respectively with said other rings of gear teeth on said member to cause said other toothed gears to react respectively against said member to cause said one toothed gear to be selectively rotated at different speeds.

7. A multiple speed reducer comprising, a rotating shaft, an oblique eccentric secured to the shaft for rotation therewith, a wobbler member rotatably mounted on the oblique eccentric and wobbled thereby and having at least three rings of gear teeth concentrically arranged on one side face thereof, at least three toothed gears concentrically located about the shaft adjacent said side face of the wobbler member, one of said toothed gears being rotatably mounted and having teeth continuously meshing with one of the rings of gear teeth on the member so as to be rotated by the member, the others of said toothed gears being secured against rotation and having teeth adapted to mesh respectively with the other rings of gear teeth on the member, cam followers on said other toothed gears, and a rotatable cam plate having cams thereon selectively engageable with the cam followers on said toothed gears as said cam plate is rotatably positioned for selectively shifting said other toothed gears into meshing engagement respectively with said other rings of gear teeth on said member to cause said other toothed gears to react respectively against said member to cause said one toothed gear to be selectively rotated at different speeds.

8. A multiple speed reducer comprising, a rotating shaft, an oblique eccentric secured to the shaft for rotation therewith, a wobbler member rotatably mounted on the oblique eccentric and wobbled thereby and having at least three rings of gear teeth concentrically arranged on one side face thereof, at least three toothed gears concentrically located about the shaft adjacent said side face of the wobbler member, one of said toothed gears having a sleeve hub rotatably mounted on said shaft and having teeth continuously meshing with one of the rings of gear teeth on the member so as to be rotated by the member, the others of said toothed gears being secured against rotation and having teeth adapted to mesh respectively with the other rings of gear teeth on the member, cam followers on said other toothed gears, and a rotatable cam plate having cams thereon selectively engageable with the cam followers on said toothed gears as said cam plate is rotatably positioned for selectively shifting said other toothed gears into meshing engagement respectively with said other rings of gear teeth on said member to cause said other toothed gears to react respectively against said member to cause said one gear to be selectively rotated at different speeds.

9. A multiple speed reducer comprising, a rotating shaft, an oblique eccentric secured to the shaft for rotation therewith, a wobbler member rotatably mounted on the oblique eccentric and wobbled thereby and having at least three rings of gear teeth concentrically arranged on one side face thereof, at least three toothed gears concentrically located about the shaft adjacent said side face of the wobbler member, one of said toothed gears having a sleeve hub rotatably mounted on said shaft and having teeth continuously meshing with one of the rings of gear teeth on the member so as to be rotated by the member, the others of said toothed gears being secured against rotation and having teeth adapted to mesh respectively with the other rings of gear teeth on the member, cam followers of said other toothed gears, a cam plate rotatably mounted on the sleeve hub of said one toothed gear and having cams thereon selectively engageable with the cam followers on said other toothed gears as said cam plate is rotatably positioned for selectively shifting said other toothed gears into meshing engagement respectively with said other rings of gear teeth on said member to cause said other toothed gears to react respectively against said member to cause said one toothed gear to be selectively rotated at different speeds.

10. A multiple speed driving mechanism for a phonograph turntable comprising an electric motor having a rotating shaft extending therefrom, a resilient mounting for said motor, an eccentric secured to the shaft for rotation therewith, a member rotatably mounted on the eccentric and oscillated thereby and having at least three rings of gear teeth arranged thereon, at least three toothed gears adjacent the member, one of said toothed gears being rotatably mounted and having teeth continuously meshing with one of the rings of gear teeth on the member so as to be rotated by the member, the others of said toothed gears being secured against rotation and having teeth adapted to mesh respectively with the other rings of gear teeth on the member, and means for selectively shifting said other toothed gears into meshing engagement respectively with said other rings of gear teeth on said member to cause said other toothed gears to react respectively against said member to cause said one toothed gear to be selectively rotated at different speeds, and a resilient driving connection between said one toothed gear and the turntable for resiliently supporting and driving the turntable at the selected speed.

11. A multiple speed driving mechanism for a phonograph turntable comprising an electric motor having a rotating shaft extending therefrom, a resilient mounting for said motor, an oblique eccentric secured to the shaft for rotation therewith, a wobbler member rotatably mounted on the oblique eccentric and wobbled thereby and having at least three rings of gear teeth concentrically arranged thereon, at least three toothed gears located adjacent the wobbler member, one of said toothed gears being rotatably mounted and having teeth continuously meshing with one of the rings of gear teeth on the member so as to be rotated by the member, the others of said toothed gears being secured against rotation and having teeth adapted to mesh respectively with the other rings of gear teeth on the member, and means for selectively shifting said other toothed gears into meshing engagement respectively with said other rings of gear teeth on said member to cause said other toothed gears to react respectively against said member to cause said one toothed gear to be selectively rotated at different speeds, and a resilient driving connection between said one toothed gear and the turntable for resiliently supporting and driving the turntable at the selected speed.

12. A multiple speed driving mechanism for a phonograph turntable comprising an electric motor having a rotating shaft extending therefrom, a resilient mounting for said motor, an oblique eccentric secured to the shaft for rotation therewith, a wobbler member rotatably mounted on the oblique eccentric and wobbled thereby and having at least three rings of gear teeth concentrically arranged on one side face thereof, at least three toothed gears concentrically located about the shaft adjacent said side face of the wobbler member, one of said toothed gears being rotatably mounted and having teeth continuously meshing with one of the rings of gear teeth on the member so as to be rotated by the member, the others of said toothed gears being secured against rotation and having teeth adapted to mesh respectively with the other rings of gear teeth on the member, and means for selectively shifting said other toothed gears into meshing engagement respectively with said other rings of gear teeth on said member to cause said other toothed gears to react respectively against said member to cause said one toothed gear to be selectively rotated at different speeds, and a resilient driving connection between said one toothed gear and the turntable for resiliently supporting and driving the turntable at the selected speed.

13. A multiple speed driving mechanism for a phonograph turntable comprising an electric motor having a rotating shaft extending therefrom, a resilient mounting for said motor, an oblique eccentric secured to the shaft for rotation therewith, a wobbler member rotatably mounted on the oblique eccentric and wobbled thereby and having at least three rings of gear teeth concentrically arranged on one side face thereof, at least three toothed gears concentrically located about the shaft adjacent said side face of the wobbler member, one of said toothed gears having a sleeve hub rotatably mounted on said shaft and having teeth continuously meshing with one of the rings of gear teeth on the member so as to be rotated by the member, the others of said toothed gears being secured against rotation and having teeth adapted to mesh respectively with the other rings of gear teeth on the member, and means for selectively shifting said other toothed gears into meshing engagement respectively with said other rings of gear teeth on said members to cause said other toothed gears to react respectively against said member to cause said one toothed gear to be selectively rotated at different speeds, and a resilient driving connection between the sleeve hub of said one toothed gear and the turntable for resiliently supporting and driving the turntable at the selected speed.

14. A multiple speed driving mechanism for a phonograph turntable comprising an electric motor having a rotating shaft extending therefrom, a resilient mounting for said motor, an oblique eccentric secured to the shaft for rotation therewith, a wobbler member rotatably mounted on the oblique eccentric and wobbled thereby and having at least three rings of gear teeth concentrically arranged on one side face thereof, at least three toothed gears concentrically located about the shaft adjacent said side face of the wobbler member, one of said toothed gears having a sleeve hub rotatably mounted on said shaft and having teeth continuously meshing with one of the rings of gear teeth on the member so as to be rotated by the member, the others of said toothed gears being secured against rotation and having teeth adapted to mesh respectively with the other rings of gear teeth on the member, cam followers on said other toothed gears, and a rotatable cam plate having cams thereon selectively engageable with the cam followers on said toothed gears as said cam plate is rotatably positioned for selectively shifting said other toothed gears into meshing engagement respectively with said other rings of gear teeth on said member to cause said other toothed gears to react respectively against said member to cause said one toothed gear to be selectively rotated at different speeds, and a resilient driving connection between the sleeve hub of said one toothed gear and the turntable for resiliently supporting and driving the turntable at the selected speed.

15. A multiple speed driving mechanism for a phonograph turntable comprising an electric motor having a rotating shaft extending therefrom, a resilient mounting for said motor, an oblique eccentric secured to the shaft for rotation therewith, a wobbler member rotatably mounted on the oblique eccentric and wobbled thereby and having at least three rings of gear teeth concentrically arranged on one side face thereof, at least three toothed gears concentrically located about the shaft adjacent said side face of the wobbler member, one of said toothed gears having a sleeve hub rotatably mounted on said shaft and having teeth continuously meshing with one of the rings of gear teeth on the member so as to be rotated by the member, the others of said toothed gears being secured against rotation and having teeth adapted to mesh respectively with the other rings of gear teeth on the member, cam followers of said other toothed gears, a cam plate rotatably mounted on the sleeve hub of said one toothed gear and having cams thereon selectively engageable with the cam followers on said toothed gears as said cam plate is rotatably positioned for selectively shifting said other toothed gears into meshing engagement respectively with said other rings of gear teeth on said member to cause said other toothed gears to react respectively against said member to cause said one toothed gear to be selectively rotated at different speeds, and a resilient driving connection between the sleeve hub of said one toothed gear and the turntable for resiliently supporting and driving the turntable at the selected speed.

16. A multiple speed driving mechanism for a phonograph turntable comprising an electric motor having a rotating shaft extending therefrom, a resilient mounting for said motor, an oblique eccentric secured to the shaft for rotation therewith, a wobbler member rotatably mounted on the oblique eccentric and wobbled thereby and having at least three rings of gear teeth concenrically arranged on one side face thereof, at least three toothed gears concentrically located about the shaft adjacent said side face of the wobbler member, one of said toothed gears having a sleeve hub rotatably mounted on said shaft and having teeth continuously meshing with one of the rings of gear teeth on the member so as to be rotated by the member, the others of said toothed gears being secured against rotation and having teeth adapted to mesh respectively with the other rings of gear teeth on the member, cam followers of said other toothed gears, a cam plate rotatably mounted on the sleeve hub of said one toothed gear and having cams thereon selectively engageable with the cam followers on said toothed gears as said cam plate is rotatably positioned for selectively shifting said other toothed gears into meshing engagement respectively with said other rings of gear teeth on said member to cause said other toothed gears to react respectively against said member to cause said one toothed gear to be selectively rotated at different speeds, said cam plate having gear teeth on the periphery thereof, an adjusting post carried by the motor and having a pinion meshing with the teeth on the cam plate and a knob for rotating the pinion to rotatably position the cam plate, and a resilient driving connection between the sleeve hub of said one toothed gear and the turntable for resiliently supporting and driving the turntable at the selected speed.

References Cited in the file of this patent

UNITED STATES PATENTS

| | | |
|---|---|---|
| 871,337 | Hawley | Nov. 19, 1907 |
| 964,847 | Brunhouse | July 19, 1910 |

FOREIGN PATENTS

| | | |
|---|---|---|
| 860,968 | France | Oct. 15, 1940 |